UNITED STATES PATENT OFFICE.

GEORGE R. PERCY, OF NEW YORK, N. Y.

IMPROVEMENT IN THE MANUFACTURE OF GLUCOSE.

Specification forming part of Letters Patent No. 46,585, dated February 28, 1865.

*To all whom it may concern:*

Be it known that I, GEORGE R. PERCY, of the city, county, and State of New York, have made a new and useful product which consists of glucose or grape-sugar made from the whey of milk or from lactine; and I do hereby declare the following to be a full and complete description of my said invention, so as to enable any person skilled in the art to which it most nearly appertains to make the said product without further invention or experiment.

The whey is put into a suitable vessel, and a small quantity of albumen is added, amounting to about two pounds of blood albumen to each ton of whey. It is then boiled from a quarter to a half hour to cause the albumen to separate the impurities and rise to the surface. It is then skimmed, strained through a filter of bone-black or other material into a vessel, and quickly evaporated by heat. The clear liquid is then set aside and crystals of lactine allowed to form. The lactine which has thus been formed, or which may be obtained in any other of the well-known ways, is then dissolved, and about one per cent. of sulphuric acid added thereto, and boiled from one to four hours, after which it is strained, and a sufficient quantity of carbonate of lime added to perfectly neutralize the effect of the acid, which may be discovered by chemical tests. It is then boiled, strained through bone-black, or other decolorizing filters, and the clear liquid evaporated to the proper consistance; or, instead of this method, it may be done in the following: The lactine may be dissolved in water, and the clear liquid obtained from malt added. When so added, to each ton of sugar is put the extracted liquor from a bushel of malt. It is then heated from a 120° to 160° Fahrenheit, and kept so for a number of hours, after which it is filtered through bone-black, and evaporated to the required consistence.

Other ways may be resorted to for obtaining glucose or grape-sugar from both whey and lactine; but the above methods will be sufficiently descriptive, as they are the simplest and most expeditious.

What I claim as my invention, and desire to secure by Letters Patent, is—

The obtaining of glucose or grape-sugar from the whey of milk or from milk-sugar.

In testimony whereof I have hereunto subscribed my name.

GEORGE R. PERCY.

Witnesses:
  GILBERT PERCY,
  SAM. R. PERCY.